United States Patent
Yano et al.

(10) Patent No.: US 12,385,805 B2
(45) Date of Patent: Aug. 12, 2025

(54) FAILURE PREDICTION SYSTEM, FAILURE PREDICTION DEVICE, AND FAILURE PREDICTION METHOD

(71) Applicant: NEC Corporation, Tokyo (JP)

(72) Inventors: Yutaka Yano, Tokyo (JP); Hiroshi Kawakami, Tokyo (JP); Makoto Saitoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 18/021,339

(22) PCT Filed: Aug. 24, 2021

(86) PCT No.: PCT/JP2021/030950
§ 371 (c)(1),
(2) Date: Feb. 14, 2023

(87) PCT Pub. No.: WO2022/045117
PCT Pub. Date: Mar. 3, 2022

(65) Prior Publication Data
US 2023/0296473 A1 Sep. 21, 2023

(30) Foreign Application Priority Data
Aug. 25, 2020 (JP) ................. 2020-141353

(51) Int. Cl.
*G01M 11/08* (2006.01)
*G01H 17/00* (2006.01)
(Continued)

(52) U.S. Cl.
CPC ................. *G01M 11/085* (2013.01)

(58) Field of Classification Search
CPC ........... G01N 21/47; G01N 2021/1744; G01N 2021/432; G01N 2021/638; G01H 9/004;
(Continued)

(56) References Cited

U.S. PATENT DOCUMENTS 9,823,098 B2 * 11/2017 Bastianini ............... H01S 3/302
10,466,172 B2   11/2019 Yaman et al.
(Continued)

FOREIGN PATENT DOCUMENTS

EP      2126820 A    12/2009
JP      S59-148835 A    8/1984
(Continued)

OTHER PUBLICATIONS

International Search Report for PCT Application No. PCT/JP2021/030950, mailed on Oct. 19, 2021.
(Continued)

*Primary Examiner* — Brandi N Hopkins
(74) *Attorney, Agent, or Firm* — Sughrue Mion, PLLC

(57) ABSTRACT

In order to provide a mechanism which predicts a risk of future failure occurrence, by using fiber optic sensing, this failure prediction system comprises: a sensing function unit which acquires the environmental information detected by the optical fiber; an event classification function unit which classifies, by type, events occurring at each position of the object indicated by the environmental information, on the basis of event classification conditions; and a failure occurrence risk calculation unit having, in advance, one or more failure models obtained by modeling a physical mechanism that leads to a malfunction in the object, wherein the failure occurrence risk calculation unit calculates a failure occurrence risk in each object by the mechanism, and outputs the accumulated result as a risk or availability.

17 Claims, 7 Drawing Sheets

(51) Int. Cl.
*G01M 5/00* (2006.01)
*G01M 99/00* (2011.01)

(58) Field of Classification Search
CPC ... G01K 11/32; G01M 11/083; G01M 11/085; G01M 5/0025; G01M 5/0041; G01M 5/0066; G01M 5/0091; G01M 11/086; G02B 6/02042
See application file for complete search history.

(56) References Cited

U.S. PATENT DOCUMENTS

| | | | | |
|---|---|---|---|---|
| 2011/0007996 | A1* | 1/2011 | Huffman | G01M 5/0025 385/12 |
| 2013/0275055 | A1* | 10/2013 | Hansen | G01N 29/4436 702/34 |

FOREIGN PATENT DOCUMENTS

| | | |
|---|---|---|
| JP | H02-031829 B2 | 7/1990 |
| JP | 2851870 B2 | 1/1999 |
| JP | 2959888 B2 | 10/1999 |
| JP | 2001-221684 A | 8/2001 |

OTHER PUBLICATIONS

English translation of Written opinion for PCT Application No. PCT/JP2021/030950, mailed on Oct. 19, 2021.

"Optical Submarine Cable Communication", supervised by Noboru Ohyama and Moriji Kuwabara, published by KDD Engineering and Consulting, published in 1991.

R. Posey Jr, G.A. Johnson and S.T. Vohra, "Strain sensing based on coherent Rayleigh scattering in an optical fibre", Electronics Letters, Sep. 28, 2000, vol. 36 No. 20, p. 1688.

G. Marra et al., "Ultrastable laser interferometry for earthquake detection with terrestrial and submarine cables", Science Aug. 3, 2018: vol. 361, Issue 6401, pp. 486 to 490.

* cited by examiner

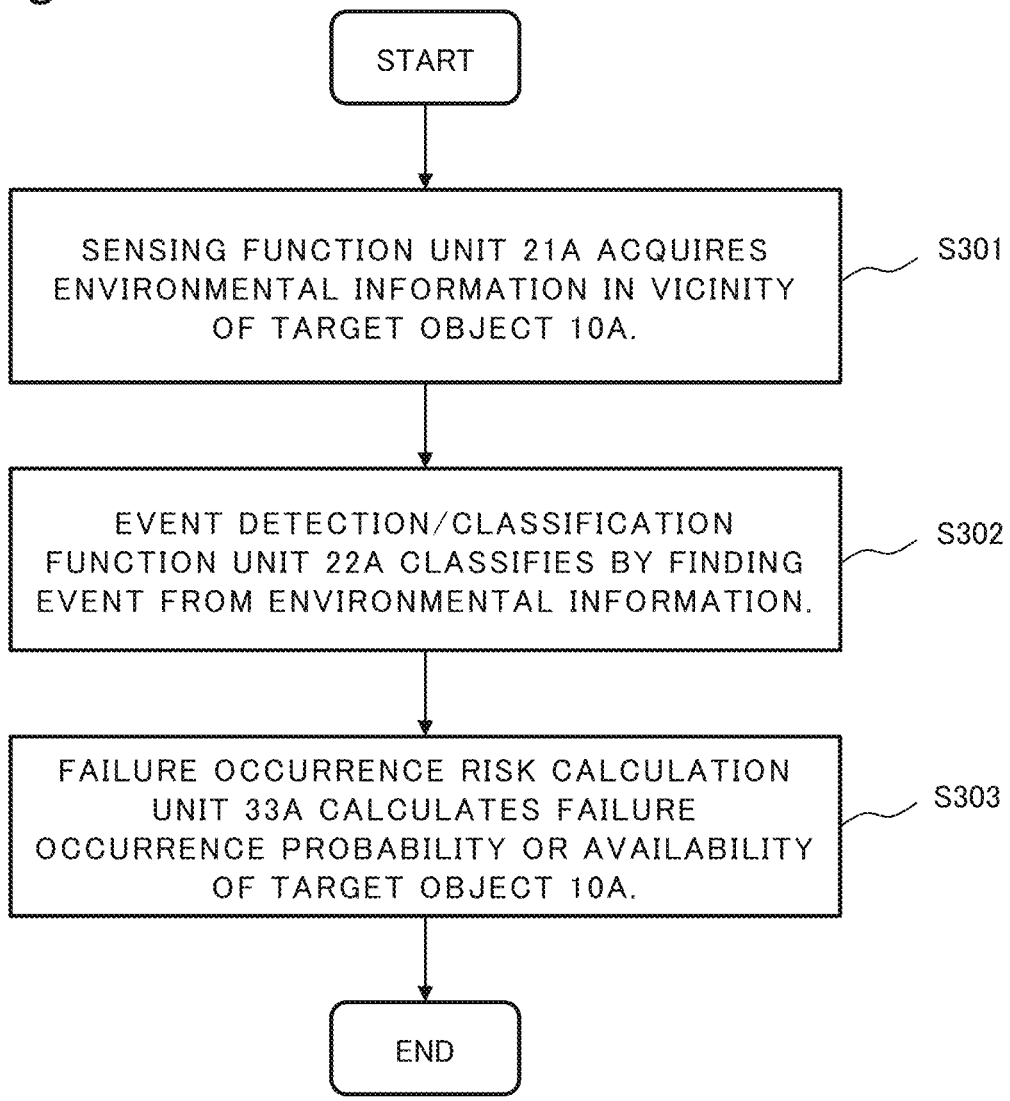

FAILURE PREDICTION SYSTEM, FAILURE PREDICTION DEVICE, AND FAILURE PREDICTION METHOD

This application is a National Stage Entry of PCT/JP2021/030950 filed on Aug. 24, 2021, which claims priority from Japanese Patent Application 2020-141353 filed on Aug. 25, 2020, the contents of all of which are incorporated herein by reference, in their entirety.

TECHNICAL FIELD

The present disclosure relates to a failure prediction system, a failure prediction device, and a failure prediction method for a long infrastructure that use an optical fiber installed along a target object.

BACKGROUND ART

There is a need of monitoring an infrastructure laid over a very long range, such as a submarine communication cable, a submarine power transmission cable, or a pipeline, as thoroughly as possible. Causes of a failure in these infrastructures include a cause being predictable from a time of designing, such as deterioration of a structural material over time, and a cause resulting from an environment of an installation place, which is difficult to be predicted at a time of designing, such as hitting something against an infrastructure, or rubbing something.

Causes resulting from an environment described above include: a cause in which time from occurrence of an event being a cause of abnormality in an infrastructure until a failure occurs in a function of the infrastructure is relatively short, and a causal relationship with respect to a failure is relatively comprehensible; and a cause in which damage gradually progresses in a long time, and a direct cause of a failure is not clear.

For example, when a submarine cable is described as an example, since a speed of deterioration of a member disposed on seabed over time is slow, the deterioration can be substantially ignored as a cause of a failure. Meanwhile, an installation environment of a submarine cable greatly affects a failure occurrence risk. Contact between a submarine cable and a fishing gear or an anchor of a ship is said to occupy about 70% of a cause of a failure. For example, techniques of PTLs 1 and 2 are disclosed as a means for monitoring such an event.

In a case in which a fishing gear or an anchor hits a submarine cable and a failure occurs, time from occurrence of an event resulting in a cause of the failure until the failure occurs is relatively short, and a causal relationship between the causal event and the failure is relatively comprehensible. Meanwhile, there are many cases in which a direct cause of a failure is not clear. In particular, in a case in which relatively small damage loss is accumulated at a same place for a long term, and is led to a failure, elucidation of a cause of the failure has been difficult.

A technique is disclosed in which a phenomenon that damage loss is accumulated in a machine or a structure in a long time is caught by using a plurality of point sensors, and a preventative maintenance action is taken by periodically carrying out an inspection. For example, PTL 3 discloses a technique for performing preventative maintenance of performing maintenance before a boiler is led to a failure. A structure such as a boiler can be inspected by a human, and can be monitored by providing a point sensor at a key point. Thus, even a relatively small abnormality that is not led to a failure can be detected, and accumulation of such an abnormality can be recognized in a form of a difference between a previous inspection record and a current inspection record. An appropriate preventative maintenance action can also be taken based on these pieces of information.

Meanwhile, in a long infrastructure such as a submarine cable or a pipeline, it is not easy to dispose a sensor in such a way as to cover the entirety. In addition, many of such long infrastructures are installed on seabed, in a desert, or the like, and it is difficult to carry out a periodical inspection. Consequently, since a small event that is not led to an immediate failure is less likely to be detected, and it is difficult to recognize an accumulation status of damage loss or the like by a periodical inspection, it has been difficult to perform appropriate preventative maintenance.

[Optical Fiber Sensing Technique]

Optical fiber sensing is, for example, a technique in which coherent light is incident on a sensing optical fiber, return light from each portion of the sensing optical fiber is detected and analyzed, and disturbance (dynamic distortion) acting on the sensing optical fiber is acquired as environmental information. Such disturbance is typically vibration of the sensing optical fiber being triggered by an acoustic wave or the like transmitted to a portion of the sensing optical fiber. A technique for acquiring, as environmental information, at least information representing presence of vibration on a portion of the sensing optical fiber as described above is referred to as distributed acoustic sensing (DAS).

The DAS technique is disclosed, for example, in PTLs 4 and 5, NPL 2, and the like. DAS is one type of a sensing method based on an OTDR method. Herein, OTDR is an abbreviation of optical time-domain reflectometry.

FIG. 1 is a diagram for describing an operation of an optical fiber sensing system according to a general OTD method. The upper portion schematically illustrates a primary configuration of the sensing system, and the lower portion schematically illustrates a power level of probe light and backscattered light thereof according to a distance, and a manner in which probe light and backscattered light thereof move over time.

As illustrated in FIG. 1, the optical fiber sensing system according to the OTDR method includes an interrogator 100 and an optical fiber 200. The interrogator 100 sends probe light 900 to the optical fiber 200 being a sensing optical fiber. The probe light 900 moves rightward through the optical fiber 200, and, in the process of moving, generates backscattered light such as backscattered light 801 and 802 at each position of the optical fiber 200. The backscattered light is typically Rayleigh backscattered light. The backscattered light moves leftward through the optical fiber 200 toward the interrogator 100, and is incident on the interrogator 100. The backscattered light generated at each position of the optical fiber 200 is affected by an environment at the position. The environment is, for example, a temperature, or presence of vibration such as acoustic vibration at the position.

The interrogator 100 detects a degree of influence of an environment at each position of the optical fiber 200, which is received by backscattered light being return light.

Further, the interrogator 100 derives, from information detected from the return light, environmental information related to an environment at each position of the optical fiber 200. The environmental information is, for example, information representing a vibration status of the optical fiber 200.

CITATION LIST

Patent Literature

[PTL 1] Japanese Patent No. 1619435
[PTL 2] Japanese Patent No. 2959888
[PTL 3] Japanese Patent No. 2851870
[PTL 4] Specification of British Patent No. 2126820
[PTL 5] Japanese Unexamined Patent Application Publication No. S59-148835
[PTL 6] U.S. patent Ser. No. 10/466,172

Non Patent Literature

[NPL 1] "Optical Submarine Cable Communication" supervised by Noboru Ohyama and Moriji Kuwabara, published by KDD Engineering and Consulting, published in 1991
[NPL 2] R. Posey Jr, G. A. Johnson and S. T. Vohra, "Strain sensing based on coherent Rayleigh scattering in an optical fibre", ELECTRONICS LETTERS, 28 Sep. 2000, Vol. 36 No. 20, p. 1688
[NPL 3] G. Marra et al., "Ultrastable laser interferometry for earthquake detection with terrestrial and submarine cables", Science 3 Aug. 2018: Vol. 361, Issue 6401, pp. 486 to 490

SUMMARY OF INVENTION

Technical Problem

As described above, in a long infrastructure, it is not easy to dispose a sensor in such a way as to cover the entirety, and monitor the entirety. Further, it is also not easy for a human to inspect a long infrastructure installed at a place such as seabed. Consequently, it has been difficult to predict failure occurrence, and perform appropriate preventative maintenance.

As described above, it has been difficult to predict a risk (hereinafter, also referred to as a "failure occurrence risk") in which a future failure occurs, by managing a history on an event that has not been immediately led to a failure with use of a means for thoroughly monitoring a vibration or an impact applied to a long infrastructure.

The present invention has been made in view of the above-described problem, and an object of the present invention is to provide a structure for predicting a future failure occurrence risk by managing a history on an event that has not been immediately led to a failure, with use of optical fiber sensing of monitoring a vibration or an impact applied to a long infrastructure.

Solution to Problem

A failure prediction system according to the present invention includes:
  an optical fiber that is installed along a target object, and detects environmental information of the target object;
  a sensing function unit that acquires the environmental information sensed by the optical fiber;
  an event classification function unit that classifies an event occurring at each position of the target object being indicated by the environmental information, based on an event classification condition, for each type; and
  a failure occurrence risk calculation unit including in advance one or more failure models acquired by modeling a physical mechanism by which the target object is led to a function failure, wherein
  a failure occurrence risk calculation unit inputs a history on the classified event to the failure model associated with the type of the event, calculates each failure occurrence risk by the mechanism in the target object, accumulates a result of the calculation in a designated section, and outputs the accumulated result as a risk or availability.

A failure prediction method according to the present invention includes:
  acquiring environmental information sensed by an optical fiber that is installed along a target object, and detects the environmental information of the target object;
  classifying an event occurring at each position of the target object being indicated by the environmental information, based on an event classification condition, for each type;
  inputting a history on the classified event to a failure model acquired by modeling a physical mechanism by which the target object is led to a function failure, and associated with the type of the event;
  calculating each failure occurrence risk by the mechanism in the target object; and
  accumulating a result of the calculation in a designated section, and outputting the accumulated result as a risk or availability.

A failure prediction device according to the present invention includes:
  a sensing function unit that acquires environmental information sensed by an optical fiber that is installed along a target object, and detects the environmental information of the target object;
  an event classification function unit that classifies an event occurring at each position of the target object being indicated by the environmental information, based on an event classification condition, for each type; and
  a failure occurrence risk calculation unit including in advance one or more failure models acquired by modeling a physical mechanism by which the target object is led to a function failure, wherein
  a failure occurrence risk calculation unit inputs a history on the classified event to the failure model associated with the type of the event, calculates each failure occurrence risk by the mechanism in the target object, accumulates a result of the calculation in a designated section, and outputs the accumulated result as a risk or availability.

Advantageous Effects of Invention

The present invention enables to provide a structure for predicting a future failure occurrence risk by managing a history on an event that has not been immediately led to a failure with use of optical fiber sensing of monitoring a vibration or an impact applied to a long infrastructure.

BRIEF DESCRIPTION OF DRAWINGS

FIG. 7 is a flowchart illustrating an operation example of the failure prediction device according to the third example embodiment of the present invention.

EXAMPLE EMBODIMENT

Hereinafter, example embodiments according to the present invention are described with reference to the drawings. Note that the following description and drawings are omitted and simplified as appropriate for clarification of description. Further, in the following each drawing, a same reference sign is attached to a same element, and overlapping description is omitted as necessary.

First Example Embodiment

[Overview of Configuration]

Figure 2:
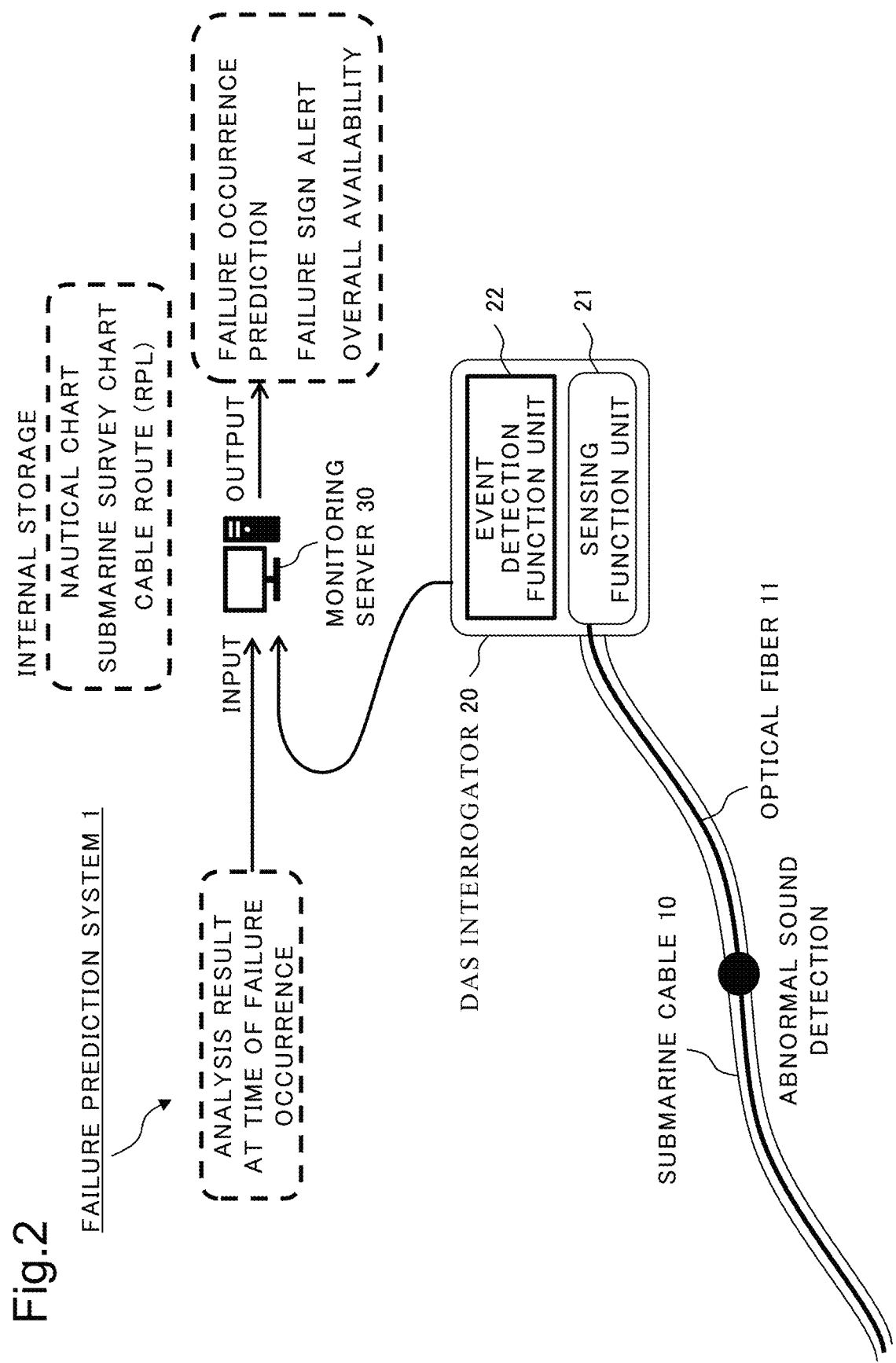
FIG. 2 is a block diagram illustrating a configuration example of a failure prediction system according to a first example embodiment of the present invention.

First, a configuration example of a failure prediction system 1 according to the first example embodiment is described with reference to FIG. 2. In this example embodiment, description is made based on a premise that a submarine cable 10 to be described later is a target object for failure prediction. Note that, the target object may also be a communication cable, a power transmission cable, a pipeline, or the like.

The failure prediction system 1 includes at least the submarine cable 10 (hereinafter, also referred to as a cable) serving as a failure prediction target, a DAS interrogator 20 for sensing environmental information (typically, a sound, a vibration, or a temperature applied to a cable) in the vicinity of the submarine cable 10 by using an optical fiber 11 included in the submarine cable 10, and a monitoring server 30.

The DAS interrogator 20 includes a sensing function unit 21 and an event detection function unit 22. An overview of the DAS technique has been described in the section of Background Art. The optical fiber 11 is accommodated within the submarine cable 10 to which covering for mechanical reinforcement is applied. Further, the optical fiber 11 may be laid along the submarine cable 10 being a target object for failure prediction. The optical fiber 11 plays a role of a sensor function, and a transmission medium of a sensing signal.

The sensing function unit 21 successively receives backscattered light generated at each point of the long optical fiber 11, and outputs a sensing signal (also referred to as "sensing data") including environmental information at each point. The environmental information may be, for example, a sound, a vibration, a temperature, or a change thereof over time.

These sensing signals are output to the monitoring server 30. In particular, for data such as a sound or vibration the data amount of which becomes enormous, the event detection function unit 22 extracts a portion which includes an abnormal event and narrows down the data amount, and then outputs the data to the monitoring server 30. For example, in a case in which a magnitude of a sound or vibration satisfies a predetermined condition, the event detection function unit 22 classifies the environmental information as an abnormal event. Herein, all events detected by the event detection function unit 22 are referred to as abnormal events.

The monitoring server 30 stores at least: information (these pieces of information are referred to as a route position list: RPL) such as a position (geographical coordinate including a water depth) where the submarine cable 10 as a monitoring target is installed, a type of the submarine cable 10 and an installation form (surface laying, burying, and presence or absence of an additional protective tube) of the submarine cable 10; and a map (nautical chart) in the vicinity of the submarine cable 10. The monitoring server 30 further includes at least a database 32 for recording an abnormal event of the submarine cable 10 in each section, and a failure occurrence risk calculation unit 33 (contents of these are described later).

[Description on Data Processing]

Figure 3:
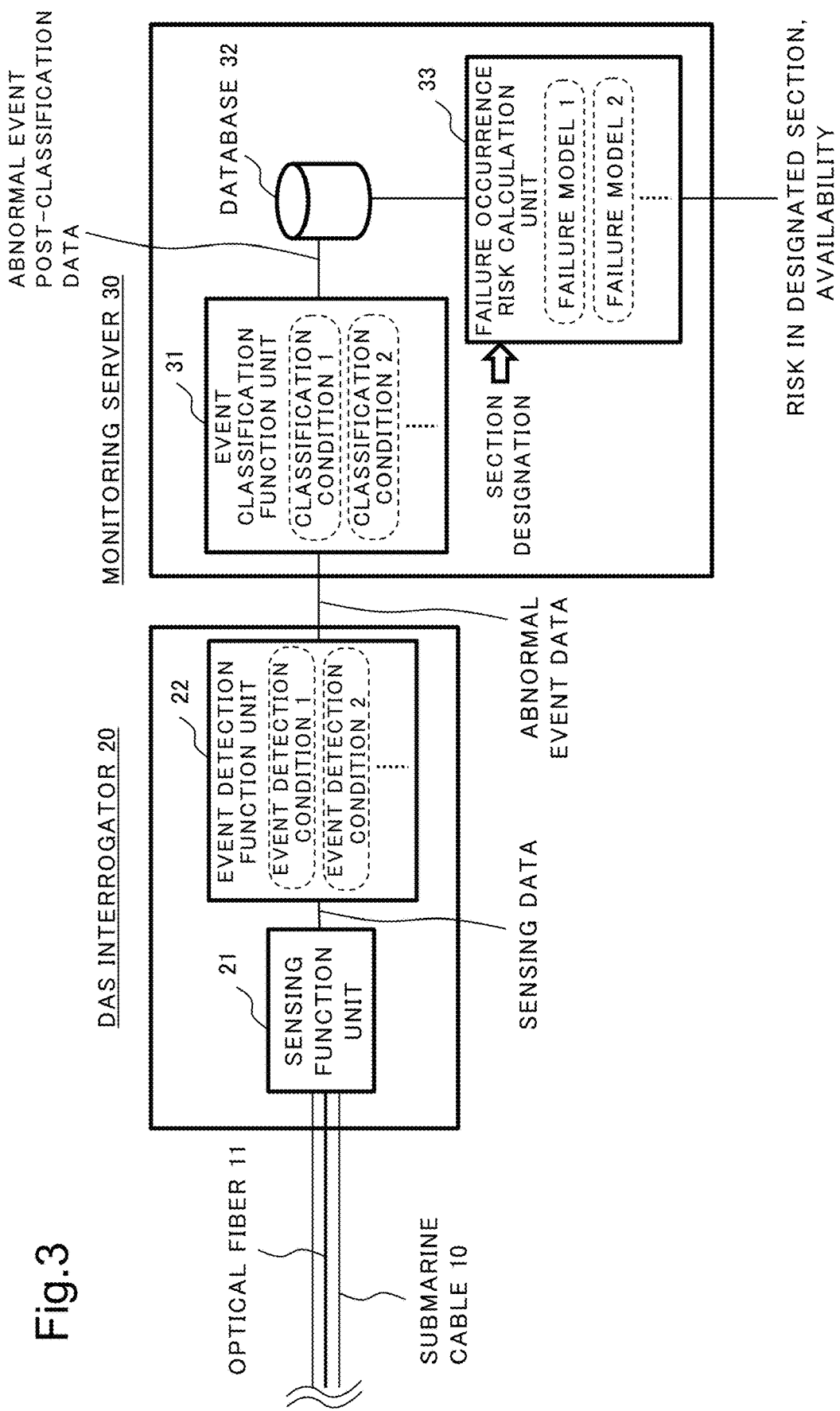
FIG. 3 is a block diagram illustrating a configuration example of the failure prediction system according to the first example embodiment of the present invention.

Next, an example of a flow of data processing of the failure prediction system 1 according to the first example embodiment is described with reference to FIG. 3.

First, a main processing content over the entirety is described.

Environmental information in the vicinity of the submarine cable 10 is collected by the sensing function unit 21, and sensing data thereof are sent to the event detection function unit 22.

The event detection function unit 22 extracts only a portion where an abnormal event is likely to be included in light of an event detection condition, and sends these pieces of abnormal event data to an event classification function unit 31.

The event classification function unit 31 classifies an event in light of the event classification condition, performs analysis such as summarizing a same event detected at a plurality of positions, or tracking a moving event, and stores, in the database 32, typified abnormal event post-classification data.

The failure occurrence risk calculation unit 33 inputs, to a failure model, a history on the abnormal event post-classification data read from the database 32, and estimates a risk at which a failure occurs in the submarine cable 10 in future.

[Processing of Event Detection Function Unit 22]

The event detection function unit 22 included in the DAS interrogator 20 extracts a portion being a portion for performing primary data processing, and including an abnormal event, from among a large number of pieces of sensing data, based on an event detection condition set therein in advance, and outputs the portion as "abnormal event data". The sensing data output from the sensing function unit 21 also include a large number of pieces of data on a place and time where and when only a background noise is included. The event detection function unit 22 eliminates these pieces of information for which analysis is not necessary within a range that does not eliminate significant information. Further, the event detection function unit 22 also performs primary data processing in such a way that a next event detection function unit can easily perform classification. An amount of output data with respect to an amount of input data to the event detection function unit 22 depends on a status, but typically, becomes about one several hundredth.

One example of processing by the event detection function unit 32 will be described in detail.

[Addition of Geographical Coordinate]

At a stage of sensing data output from the sensing function unit 21, an acquisition position of an individual piece of data is expressed by a position on an optical cable (e.g., a distance from an end of an optical cable). The event detection function unit 22 adds, to an individual piece of data, a geographical coordinate (including a water depth) associated with a position on a cable.

A geographical coordinate (including a water depth) associated with a position on each cable is derived by collating between a position on a cable, and a geographical coordinate of an optical cable written in a construction record. Since this correspondence is not changed after cable installation, a correspondence is derived in advance by using information such as an RPL held in the monitoring server 30, and stored in the event detection function unit 22.

[Correction of Unevenness of Sensor Characteristic: Difference such as Cable Type and Correction]

This processing is processing to be performed according to needs.

In the submarine cable 10 for acquiring environmental information, a type and an installation method of a cable differ depending on an installation place. Therefore, a characteristic as a sensor of the submarine cable 10 differs for each place. For example, a degree of attenuation in a specific frequency range of an acquired environmental information signal differs. In order to acquire an event classification result of enhanced reliability in the event detection function unit 22, it is desirable to perform correction processing of causing the environmental information signal to approach an original signal by removing such influence.

Herein, a difference in a type of a cable is, for example, a difference in a cross-sectional structure by a purpose such as power transmission/communication, a difference in a structure of protective covering (presence or absence of an exterior steel wire or a type thereof), or the like. A difference in an installation method is, for example, a difference in a method such as a method in which a cable is simply laid on a seabed surface, a method in which a cable is buried by digging a groove in seabed, or the like.

Since these differences for each place of a cable can be known by referring to a manufacturing record or a construction record (e.g., an RPL), correction can be performed substantially uniquely for each place of the submarine cable 10. A specific correction method is, for example, increasing an amplitude of a specific frequency range by a filter operation.

Note that, in addition to applying such correction to the acquired data side, there is also a method of applying such correction to a classification condition side, as described later. For example, when there is a characteristic that a high frequency side of environmental information is attenuated due to a structure of a cable, matching of pattern identification can be easily acquired by attenuating a high frequency side of a classification condition according to a type of a cable at an acquired position, without correcting acquired data. However, correcting the acquired data side has an advantage such that availability of data usage increases, and is preferable.

[Correction of Unevenness of Sensor Characteristic: Difference for each Site and Calibration]

A cause of a fluctuation of a sensor characteristic at each point of the laid submarine cable 10 is not only uniquely determined (estimable) from the above-described construction record or the like. For example, even in a record in which a cable is buried at a constant depth, actually, there may be a case in which a burying depth varies for each place, or covered earth and sand are washed away and exposed.

As a measure against this problem, a method is considered in which calibration is performed by utilizing, as a reference, a sound transmitted in a wide range on-site. As a reference sound, an artificial sound or a naturally generated sound may be utilized. Since a same sound is sensed at each point on the submarine cable 10, correction is performed for each point in such a way that these sounds approach an identical sound, or approach a value according to a distance from a sound source.

Further, this calibration also enables to recognize whether each point on the submarine cable 10 is suitable for acquisition of intended environmental information. For example, sensitivity at a certain point is very low and correction cannot be completed, a sound at a certain point is likely to resonate in a specific frequency range and correction is also difficult, and so forth. These points where acquisition of an environment is somewhat difficult can be extracted by comparing with a moving average trend before and after on a cable. In view of the above, observation performance can be improved by excluding these points where acquisition is somewhat difficult, while paying attention to a distribution of observation points, and utilizing data at a point where it is presumed that almost average environmental information can be acquired, at a time of event detection/classification to be described later.

[Dividing for Each Frequency Band]

The present processing is processing to be performed according to needs. The event detection function unit 22 extracts, from among sensing data, a portion where an event is likely to be included in light of an event detection condition, but it is desirable to provide in advance a function of dividing sensing data for each frequency band. A predetermined band is, for example, a band from a very low frequency to 0.01 Hz, from 0.01 to 0.1 Hz, from 0.1 to 1 Hz, from 1 to 10 Hz, and from to 100 Hz. However, it is desirable to overlap each band to some extent in order to prevent skipping of detection of an event being present in the vicinity of a boundary of a band.

[Event Detection Function]

The event detection function unit 22 determines whether an event is included in data divided for each frequency band in a relatively simple condition, and outputs the result of determination. For example, the event detection function unit 22 determines whether a fixed threshold value or a threshold value associated with a moving average value is exceeded with respect to an absolute value of an intensity.

The event detection function unit 22 hands over abnormal event data to the next event classification function unit 31. The abnormal event data herein indicate primarily-processed sensing data (corresponding portion), based on which a certain event is determined to be included. This does not require to hand over data of a portion where event information is clearly not included, therefore, it is possible to further narrow down data to be processed by the event classification function unit 31. Further, it is also possible to eliminate useless processing as in a case in which frequency analysis is performed again by the event classification function unit 31.

Herein, original sensing data (before being subjected to primary processing) including the event detection portion may also be recorded by being handed over to the monitoring server 30 regardless of whether the sensing data are used by the event classification function unit 31. For example, the sensing data can be utilized in a case in which detailed analysis is desired later (off-line), and the like. It is desirable to set a programmable specification to enable refined settings of an operation according to a usage or a status as described above.

[Processing of Event Classification Function Unit 31]

One example of a function of the event classification function unit 31 included within the monitoring server 30 will be described in detail.

The event classification function unit 31 examines whether a known abnormal event is included in received abnormal event data in light of a classification condition prepared in advance. Further, the event classification function unit 31 outputs, to the database 32, a most probable classification result together with accompanying information such as a time and a place, as abnormal event post-classification data. At this occasion, information such as a detection intensity may also be included. Since "waveform" information is eliminated as a result of classification processing, an amount of output data with respect to an amount of input data to the event classification function unit 31 typically becomes about one several thousandth.

However, as reference information, abnormal event data as a basis for classification or the like may be stored in the database 32 by being attached to abnormal event post-classification data.

Data that cannot be classified as a known abnormal event with sufficient probability are included in abnormal event data. In such case, the classification result of such data is an unknown event type, or absence of an event. It is also desirable to record, in the database 32, such abnormal event data within a range allowable for a communication capacity or a capacity of the database 32.

These pieces of history data including a "waveform" are normally not utilized by the failure occurrence risk calculation unit 33, but a usage example will be described in a second example embodiment described later.

The event classification function unit 31 includes in advance a plurality of classification conditions for classifying abnormal event data. The classification condition is information in which "a feature unique to an abnormal event" for use in classification, and information output at a detection time of the event make a pair. In addition to the above, there is accompanying information. Herein, information to be output at a detection time of an event is information to be handed over to the failure occurrence risk calculation unit 33, which is next processing, and includes at least a term representing a type of the abnormal event. Further, an intensity or the like of an observed event is also output depending on a type of an event.

Further, the information accompanying a classification condition is designation of additional processing after classification, and the like. The processing after classification is, for example, identification of a same sound, tracking of a moving sound source, or the like, which is described later, and the accompanying information is flag information as to whether these pieces of processing are performed or not.

"A feature unique to an abnormal event" for use in classification within the classification condition is prepared in such a way that the feature can be accurately classified, even when an installation place of a cable, soil of seabed, or the like is changed. The classification method is, for example, finding a feature that is less likely to be affected by an installation place of a cable, soil of seabed, or the like, classifying based on the feature, and the like.

Even when a same abnormal event cannot be accurately classified in one classification condition due to a fluctuation of an installation status of a cable or the like, the same abnormal event may be associated with a same abnormal event type in such a way that the same abnormal event is detected in any of a plurality of classification conditions.

As this classification condition, a technique such as frequency analysis, a manner in which an event changes over time, pattern identification, and machine learning may be combined and used.

[Processing of Summarizing Same Sound Detected at Plurality of Positions]

There is a case in which a sound emitted at a place away from a cable spreads concentrically or spherically, and is detected at a plurality of places of the cable. It is not proper to handle these sounds as individual events, and these sounds themselves may adversely affect failure risk prediction. In view of the above, an event is estimated and identified as a sound emitted from one sound source by further analyzing a type, a geographical coordinate, and time information of the detected event. The event classification function unit 31 performs such processing, when there is a same sound, and when the sound is an abnormal event of a type to be summarized, after each piece of abnormal event data is classified.

Determination as to whether to perform identification processing of a same sound is prepared in advance as a flag in a classification condition. For example, in a classification condition for classifying, as a feature, a sound/vibration when a bottom fishing gear moves a place slightly away from the submarine cable 10, a flag of performing processing of summarizing a same sound is True. Meanwhile, in a classification condition for classifying, as a feature, a sound/vibration when a certain object hits a cable, a flag of performing processing of summarizing a same sound is False.

The processing of summarizing a same sound can be performed not only for an underwater sound but also for a vibration transmitted through a seabed ground.

Further, it is also possible to separate/identify a plurality of sound sources/vibration sources generated at a position away from a cable by utilizing an advantage of the present configuration in which a long optical fiber itself can be utilized as a sensor array. In a plurality of sound sources the spatial positions of which are different from one another, separation is possible even when a sound is observed while overlapping temporally, by using a well-known sound source separating technique.

As one example, a case is considered in which two bottom fishing gears are simultaneously pulled, and an optical fiber cable nearby detects the two fishing gears altogether. Since spatial positions of two sound sources are different, a vibration reaching each point of the optical fiber also differs a little. By applying arithmetic processing of sound source separation to a sound/vibration detected at each point of the optical fiber, it is possible to extract information on the number of fishing gears and an approximate position thereof.

The processing of summarizing a same sound, and processing of sound source separation are pieces of processing that are selected to be performed or not according to an application status of the failure prediction system. These pieces of processing are performed, for example, by the event classification function unit 31. In these pieces of processing, "waveform" data of a sound/vibration serving as a processing target are needed to accompany abnormal event post-classification data. After processing of summarization or sound source separation, storage and accumulation of these pieces of waveform data into the database 32 may not be needed.

[Tracking Processing of Moving Sound Source]

For example, when a bottom fishing gear moves a place slightly away from a cable, a sound source of the bottom fishing gear also moves. When the sound source moves while emitting a sound, abnormal event post-classification data of a same type are continued to be detected while moving a place. In view of the above, preparing a moving object model in the event classification function unit 31, and applying past detection information to the moving model enables to approximately recognize a speed and a traveling direction of the fishing gear, and predict a place to be detected next. Further, it becomes also possible to examine a place that is predicted to be detected next in more spatial and temporal details. Further, since a possibility with which an event of a same type is detected again is high, detection/classification reliability can be further increased by lowering a detection threshold value of the event, or the like.

Determination as to whether to perform tracking processing of a moving sound source is prepared in advance, as a flag in a classification condition. For example, in a classification condition for classifying, as a feature, a sound/vibration when a bottom fishing gear moves a place slightly away from the submarine cable 10, a flag of performing tracking processing is True. Meanwhile, in a classification condition for classifying, as a feature, a sound/vibration when a certain heavy object reaches the seabed near the cable, a flag of performing tracking processing is False.

The processing of tracking a moving sound source can be performed not only for an underwater sound but also for a vibration transmitted through a seabed ground.

As one example, it is assumed that, in a case in which an Otter Troll fishing gear advances in contact with the seabed, the event classification function unit 31 includes in advance, as a classification condition, a feature pattern of a vibration sensed by the submarine cable nearby. The event classification function unit 31 finds, from abnormal event data, a feature that the Otter Troll fishing gear is advancing the seabed, and determines that correspondence to a classification condition that "a bottom fishing gear advances the seabed" is most probable. This classification condition also includes, in addition to a term (name of a type) indicating a type of an abnormal event that "a bottom fishing gear advances the seabed", flag information instructing subsequent processing of performing identification processing of a same sound, and tracking by applying to a moving model, after classification.

[Processing of Failure Occurrence Risk Calculation Unit 33]

The failure occurrence risk calculation unit 33 provided in the monitoring server 30 includes in advance a model (hereinafter, referred to as a failure model) that is led to a failure by accumulation of an abnormal event a large number of times, for each physical mechanism thereof. Further, the failure occurrence risk calculation unit 33 reads, from the database 32, abnormal event post-classification data for each designated section of the submarine cable 10, and calculates a risk for each failure model. The failure occurrence risk calculation unit 33 sums a risk value output of each failure model, and outputs the sum as a risk value in the section. Details on an algorithm of failure occurrence prediction are described later.

The failure occurrence risk calculation unit 33 performs an operation of calculating this failure occurrence risk at each predetermined time, or based on a calculation instruction. Further, the monitoring server 30 outputs at least one of failure occurrence prediction, a failure sign alert, and comprehensive availability information.

[Algorithm of Failure Occurrence Prediction]

One form of a failure occurrence prediction method is that the failure occurrence risk calculation unit 33 holds a failure model, and the failure occurrence risk calculation unit 33 inputs, to the model, abnormal event post-classification data acquired by sensing, and estimates a remaining margin amount. The failure model is a model that, when a certain abnormal event has occurred in a same section a plurality of times, performs estimation until the abnormal event is led to a cable failure by a certain physical mechanism.

As one example, a calculation example of a failure model that performs prediction in which an object such as a rock falls on the submarine cable 10, and the submarine cable 10 is damaged and led to a failure is described. A history on abnormal event post-classification data indicating that an object has hit is calculated for each place of the submarine cable 10 in such a way that addition is performed by multiplying a coefficient 0 for an event the degree of intensity of which is less than 3 (substantially there is no influence), addition is performed by multiplying a coefficient 5 by a degree for an event the degree of which is from 3 to 5, addition is performed by multiplying a coefficient 10 for an event the degree of which is from 5 to 8, and addition is performed by multiplying a coefficient 20 for an event the degree of which is from 8 to 10. The failure occurrence risk calculation unit 33 totalizes, by this method, all of event histories of a corresponding type in a section that can be recognized to be the same in this failure model, and predicts that a failure occurs when a total value thereof reaches 100. This example of a failure model is an example in which a failure risk non-linearly increases with respect to a degree of event intensity. There may be a failure model calculatable by simple accumulation.

A failure model as described above is present for each physical mechanism leading to damage. Further, the failure occurrence risk calculation unit 33 includes in advance one or more failure models as described above, and outputs a failure occurrence probability or availability in a designated section by summing each output value.

In this prediction method, it is necessary to prepare in advance a relationship of a margin amount until failure occurrence with respect to accumulation of an abnormal event acquired by sensing, for each failure model. In a case in which the number of pieces of field case data is small, the relationship is recognized and prepared by performing a simulated damage experiment.

Further, another form is a failure model based on a probability with which an accident happens. Although the form is a failure model based on a probability event, the failure model may be combined with a history on an abnormal event.

Figure 4:
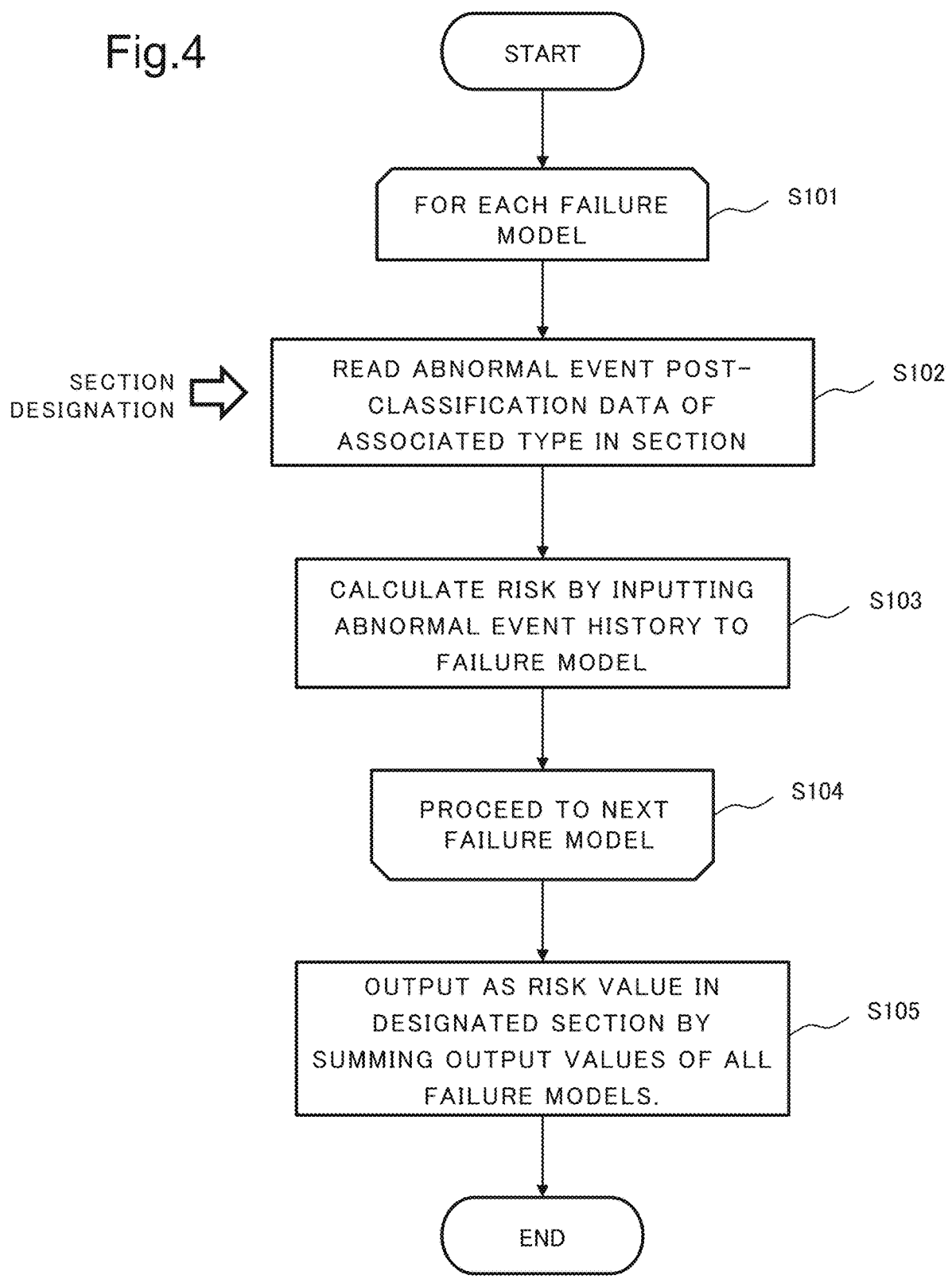
FIG. 4 is flowchart illustrating an operation example of a failure occurrence risk calculation unit 33 according to the first example embodiment of the present invention.

One example of a processing flow within the failure occurrence risk calculation unit 33 is illustrated in FIG. 4.

Abnormal event post-classification data detected/classified as described above are accumulated in the database 32. The failure occurrence risk calculation unit 33 reads, for each prepared failure model (S301), abnormal event post-classification data of a type that affects the failure model over a designated section of the submarine cable 10 (S102), and calculates a risk by inputting, to the failure model, a read abnormal event post-classification data history (S103). This is performed for all failure models to sum a risk value, and the summed risk value is output as a risk value in the designated section (S105).

Specific Examples

Five examples of a failure model are described for a case in which the submarine cable 10 is a target object.

The first example is damage loss by friction. There is a case in which the submarine cable 10 is caught on a sharp reef, and there is a clearance between the submarine cable 10 and the seabed (the submarine cable 10 is floating above the seabed). The first example is a failure model of a physical mechanism in which a contact point of the submarine cable 10 with the reef is rubbed by swaying of the submarine cable 10 due to a tidal current or the like on the seabed in such a case, and covering of the submarine cable 10 is worn out over a long period of time, thus leading to a failure. In such a case, a rubbing sound or vibration is constantly detected. Further, for example, a unique sound or vibration is detected at a point of time when an exterior steel wire of the submarine cable 10 is cut, thus leading to an abnormal event indicating a sign of failure.

In this way, a history in which a unique sound or vibration is constantly detected at a specific place on a long infrastructure is highly likely to have a correlation with a future failure. The above is an example of the submarine cable 10, however, in an infrastructure such as a pipeline through which a fluid is flowing, there is a possibility that an abnormal sound or vibration resulting from an internal fluid may have a relationship with respect to a future failure.

The second example is an example of a failure model in which an event that hardly becomes a risk is processed. For example, even when a sound or the like emitted from marine life (e.g., a gun shrimp) living near the submarine cable 10 is accumulated a large number of times, a possibility with which the submarine cable 10 is led to a failure is extremely small. The event classification function unit 31 also classifies a sound emitted from marine life, and outputs the sound to the monitoring server 30, as abnormal event classification data. The failure occurrence risk calculation unit 33 also includes a failure model in which an event of a sound or vibration emitted from specific marine life as described above is handled. In the model, by setting a coefficient parameter multiplied by the number of times of event occurrence to a value approximate to zero, a calculation result becomes a result in which an event hardly appears as a failure risk.

The third example is an example in which an object drops near the submarine cable 10, a heavy object moves nearby, or the like by setting a certain section of the submarine cable 10, as a unit. As a hazardous object that falls on the seabed, an anchor of a ship, a fishing gear, and the like are considered. As a phenomenon that a heavy object moves nearby, an event such as in a case in which a weight at a floating reef is dragged, a ship is dragging an anchor, Otter Troll fishing, and a seabed landside are considered. The DAS interrogator 20 (hereinafter, also referred to as an "interrogator") can detect, as an abnormal event, a vibration of these events transmitted through the seabed, even when these objects do not directly hit the submarine cable 10.

A failure model of these abnormal events is primarily a probability model in which a heavy object hits the submarine cable 10. This is because it is considered that, when a heavy object hits the submarine cable 10, the event is immediately led to a failure. When a heavy object directly hits the submarine cable 10, but the event is not led to a failure, the event may be handled by a failure model in which accumulation or progress of damage of the submarine cable 10, and a probability with which the event corresponds to an accident are combined.

In this way, "an abnormal event before being led to a failure" includes not only an event in which damage is accumulated in a long infrastructure, but also an event indicating that a long infrastructure is installed at a place where a damage risk is high.

The fourth example is exposure of the buried submarine cable 10. In a shallow sea, a method in which a groove is dug in the seabed, and the submarine cable 10 is buried in the groove is generally performed. Earth and sand covering the submarine cable 10 play a role of a protective layer, and prevent the submarine cable 10 from directly hitting a fishing gear or the like. However, in a case of the seabed where earth and sand are likely to move by a tidal current or the like, the buried submarine cable 10 may be exposed. There is also a case in which a work of burying an exposed portion again is needed.

An environmental sound/environmental vibration sensed by the submarine cable 10 changes between a time when the submarine cable 10 is buried, and a time when the submarine cable 10 is exposed. For example, there are a sound that earth and sand together with a tidal current hit the exposed submarine cable 10, a vibration resulting from application of Kalman vibration to the submarine cable 10 by a flow of seawater, and so forth.

In this way, even in a sound or vibration that cannot be said to be abnormal, an analysis history that an event has changed over time may have a correlation with a future failure. For example, a possibility that a covering object or an installation status has changed is considered. A point that a change in a covering object or an installation status is important in predicting future failure occurrence is common among various long infrastructures such as an aerial cable and a pipeline, as well as the submarine cable 10.

The fifth example is approach of the submarine cable 10 to a hydrothermal vent. In a hydrothermal vent on the seabed, water of about 300° C. may erupt by a water pressure, and a general submarine cable is led to a failure when being directly brought into contact with such hot water. Therefore, the submarine cable 10 is laid while avoiding a hot water eruption area. However, there is a case in which there is an eruption point that could not be identified by a preliminary survey, and the submarine cable 10 may be laid near the eruption point; or an eruption point newly appears, and a water temperature at an existing spring water point rises. Monitoring a change in an environmental temperature by the submarine cable 10 enables to notice a risk.

This case is also a random probability model in which an accident happens as well as a case in which a rock falls. However, an abnormal event that a temperature changes over time is also useful for failure occurrence prediction in a damage accumulation model of a long infrastructure. For example, since it is often a case that a fluid flowing through a pipeline is flowing at a temperature different from that of a surrounding environment, abnormality of a temperature may have a relationship with damage of thermal insulation or leakage of a fluid.

In addition to the above, when a vibration of a landside nearby is detected, it is clear that a terrain in the vicinity of the landslide is unstable. The submarine cable 10 laid on a slope or the like sometimes slides down in a case of an unstable installation state. This also leads to a possibility that a future risk such as caught on a reef may be considered. Accumulating these event histories on vibration is helpful for considering a future maintenance action.

[Usage Example of Information Called Failure Occurrence Risk]

Information indicating high and low of a failure occurrence risk is acquired by a function of accumulating sensing data and estimating a risk thereof. Three usage examples of the information are described by way of the submarine cable 10.

The first usage example is preparation of a repair work and the like. A repair work herein includes arranging and preparing materials needed, making a contract for a bypass communication route in a disconnected period, and reserving a repair work ship. Performing preventative replacement repair by these operations enables to shorten a service suspension period, as compared with a case in which repair is arranged after a failure occurs. Further, repair can be performed systematically while avoiding a period during which an important event such as a national event is carried out.

The second usage example is reflecting availability (reliability) to a line lease fee or the like. When an estimation method and an index of a failure occurrence risk can be compared among a plurality of lines, a line in which a failure occurrence risk is recognized to be low can be sold at a higher price, and a line in which a risk is relatively high can be sold for a usage in which hindrance is less because preparation for disconnection is secured separately, and so forth.

Further, in a case in which an insurance for compensating a repair cost at a time of failure occurrence is set, the information may be used for calculating an insurance fee according to a failure occurrence risk.

The third usage example is enabling to more appropriately select an installation route where a risk is small. Since a causal relationship of a phenomenon that is led to a failure over a long period of time is less likely to be directly recognizable, it is often a case that risk determination on the phenomenon relies on a human experience or intuition. Generally, a most economical route is a shortest route. In contrast, bypassing an area where a risk is high may increase a cable length by several ten kilometers, and an additional amplifying repeater may be required, therefore, determination on the necessity is not easy. Enabling to quantitatively express a failure occurrence risk potential can achieve determination by comparing a cost required for bypassing a route, a repair cost at a time of failure occurrence, and a value acquired by multiplying a failure occurrence probability by an estimated amount of damage.

By a configuration and data processing described above, it becomes possible to accumulate a record on an abnormal event that has been directly or indirectly added to a long infrastructure, and that has not been immediately led to a failure, and to calculate a future failure occurrence risk.

As described above, the failure prediction system 1 according to the first example embodiment includes the optical fiber 11, the sensing function unit 21, the event detection function unit 22, and the failure occurrence risk calculation unit 33. The optical fiber 11 is installed along a target object (e.g., the above-described submarine cable 10), and detects environmental information of the target object. The sensing function unit 21 acquires the environmental information sensed by the optical fiber 11. The event detection function unit 22 classifies an event occurring at each position of the target object indicated by the environmental information, based on an event classification condition, for each type. The failure occurrence risk calculation unit 33 includes in advance one or more failure models acquired by modeling a physical mechanism by which the target object is led to a function failure. Further, the failure occurrence risk calculation unit 33 inputs a history on the classified event to a failure model associated with the type of the event, calculates each failure occurrence risk by the mechanism in the target object, accumulates a result of the calculation in a designated section, and outputs the accumulated result as a risk or availability.

As described above, in the failure prediction system 1, an event occurring at each position of a target object is classified based on environmental information sensed by an optical fiber provided along the target object. Further, the failure prediction system 1 inputs to a failure model associated with the type of the classified event, and calculates a failure occurrence risk for each section. Therefore, the failure prediction system 1 enables to provide a structure for predicting a future failure occurrence risk by managing a history on an abnormal event that has not been immediately led to a failure with use of optical fiber sensing of monitoring a vibration or an impact applied to a long infrastructure.

Second Example Embodiment

A failure prediction system 1 according to the second example embodiment is a system in which a function of improving failure risk prediction performance by learning is added to the first example embodiment, and description is made by using the same configuration diagram and the like as those in the first example embodiment.

When a submarine cable 10 has been led to a failure and repaired, or has undergone preventative replacement, a failure portion is recovered, and an actual degree of damage of is analyzed. This enables to achieve prediction accuracy improvement of a failure model by comparing an actual degree of damage with a result of a failure model estimated within a monitoring server 30, and feeding back.

Accuracy improvement is achieved by reviewing a progress speed parameter in a failure model, and in addition to the above, there is also a possibility that a feature of an abnormal event representing a sign of failure occurrence is found by analyzing again a history on accumulated abnormal event data. When the feature is found, a degree of progress on the way of leading to a failure can be known.

Further, there is also a possibility that a new failure model is found by analyzing an actual degree of damage.

A failure model improved as described above can be utilized for failure occurrence prediction in the first example embodiment.

[Structure of Learning by Analysis of Failure Portion and Collation with Accumulated Data]

Figure 5:
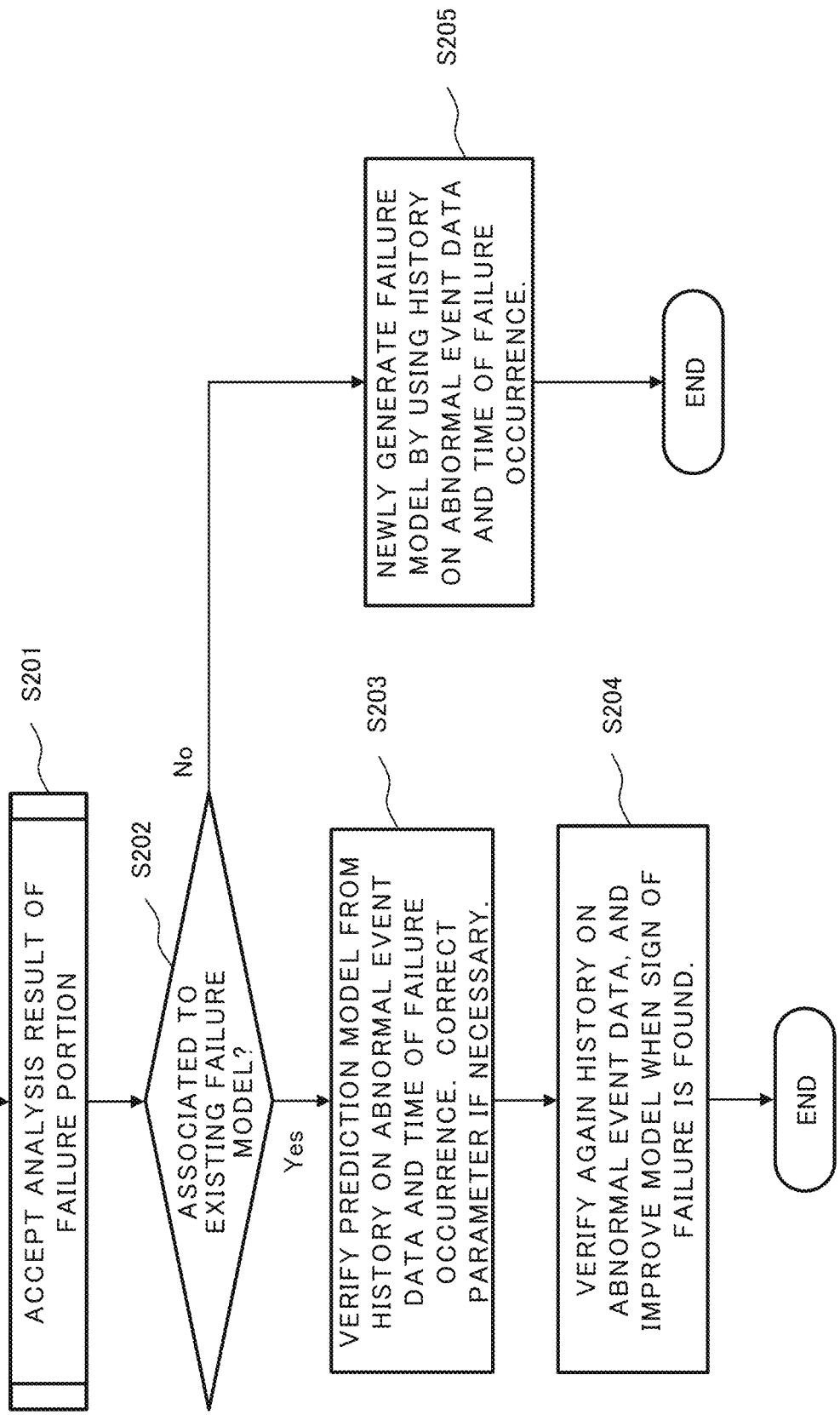
FIG. 5 is a flowchart illustrating an operation example of a monitoring server 30 of a failure prediction system according to a second example embodiment of the present invention.

In a case in which a failure actually occurs, and a failure portion can be recovered by a repair work, performing a procedure as illustrated in one example in FIG. 5 with use of the monitoring server 30 by analyzing the failure portion enables to improve a failure model.

First, the monitoring server 30 accepts a result of analysis of a failure portion (S201). The monitoring server performs conditional branching by determination as to whether the failure model corresponds to an existing failure model, based on the analysis result (S202). In a case in which the failure model corresponds to an existing failure model, the monitoring server 30 verifies a prediction model from a history on an abnormal event at the target portion, and a time of failure occurrence, and modifies the parameter if necessary (S203). Next, the monitoring server reviews the history on abnormal event data, and when a phenomenon being a sign indicating a correlation with respect to progress of a failure is found, the monitoring server 30 registers the phenomenon, as a feature pattern of a new abnormal event. Further, the monitoring server 30 improves the failure model (S204).

In a case in which the failure model does not correspond to an existing failure model, the monitoring server 30 investigates a physical mechanism of the failure model, and generates a new failure model from a history on an abnormal event at the target portion, and a time of failure occurrence (S205).

Note that, pieces of processing of S204 and S205 may be performed by a human, or may be performed by the monitoring server 30. The monitoring server 30 may use machine learning, when pieces of processing of S204 and S205 are performed.

In order to consider improvement or addition of a failure model as described above, information is insufficient only by accumulating abnormal event post-classification data. It is necessary to accumulate abnormal event data classified as an unknown event, accumulate waveform data in which data classified as a known event are attached as reference information, and the like.

Note that these pieces of processing of improving or adding a failure model may also be performed by using machine learning and the like.

Further, a classification condition within an event classification function unit 31, or an event detection condition within an event detection function unit 22 may be added, or a parameter may be adjusted, as necessary.

Adding the processing flow described above to the first example embodiment enables to improve risk calculation accuracy of a known failure model, and predict a failure of a newly found failure model by a physical mechanism thereof.

Further, similarly to the example embodiment, the failure prediction system 1 according to the second example embodiment also enables to provide a structure for predicting a future failure occurrence risk by managing a history on an abnormal event that has not been immediately led to a failure with use of optical fiber sensing of monitoring a vibration or an impact applied to a long infrastructure.

Modification Example

A failure model described in the present example embodiment in which a classification condition of an abnormal event, and a failure model that estimates accumulation of a risk that is led to a failure are sharable by a long infrastructure laid at another place. A new or improved classification condition of an abnormal event, and failure model, which have been acquired by a certain long infrastructure can be expanded in a failure prediction system for another similar long infrastructure.

A way of dividing into two functions, namely, classification of an abnormal event within a DAS interrogator 20, and estimation of a failure model within the monitoring server 30, which have been described in the present example embodiment, is one example, and the two functions may be integrated in one device, or a boundary for dividing roles may be changed.

In the present example embodiment, DAS has been described as an example of an optical fiber sensing method, but other methods such as DVS, DTS, and BOTDR may be available. Herein, DVS is an abbreviation of distributed vibration sensing, DTS is an abbreviation of distributed temperature sensing, and BOTDR is an abbreviation of Brillouin optical time-domain reflectometry.

Further, optical fiber sensing capable of performing sensing widely and distributionally, other than the OTDR method, may also be available. For example, PTL 6 and NPL 3 disclose a distributive optical fiber sensing technique using transmitted light, in place of the OTDR method using reflected return light.

In the present example embodiment, an example in which a long infrastructure is in an operation period has been described, but it is desirable to monitor the long infrastructure also in a laying work period or an operation suspension period. Since a risk event in a long infrastructure occurs without depending on whether the long infrastructure is in operation or not, it is desirable to reduce a non-monitoring period. Further, it is desirable not to lose a record on a detected abnormal event, and use the record for risk evaluation by unifying with a record in operation.

In the present example embodiment, a communication submarine cable has been mainly described, but monitoring using the present disclosure is possible also for a submarine power cable including an optical fiber, a submarine pipeline through which an optical fiber extends, and the like. Even in a long infrastructure such as a roadbed, a road, and a tunnel, it is possible to monitor a mechanism by which the long infrastructure is led to a failure by accumulation of a failure risk, similarly to the present example embodiment.

In the present example embodiment, an example in which a cable is used in a sea has been described, but the present example embodiment is also advantageous for implementation in a river, a lake, and a marsh.

In the present example embodiment, an example in which a cable is used underwater has been described, but the present example embodiment is similarly applicable to an underground cable, an aerial cable, and the like.

In the present example embodiment, an example in which optical fiber sensing is used as a detection means of a sound or vibration sensed by a submarine cable has been described, but a sound or vibration sensor element built in submarine equipment may be loaded, and detect a sound or vibration using the built-in sensor element.

In the present example embodiment, an example of monitoring by way of a sound or vibration phenomenon, as environmental information sensed by a submarine cable has been described, but monitoring may be performed, for example, by temperature change.

Third Example Embodiment

Figure 6:
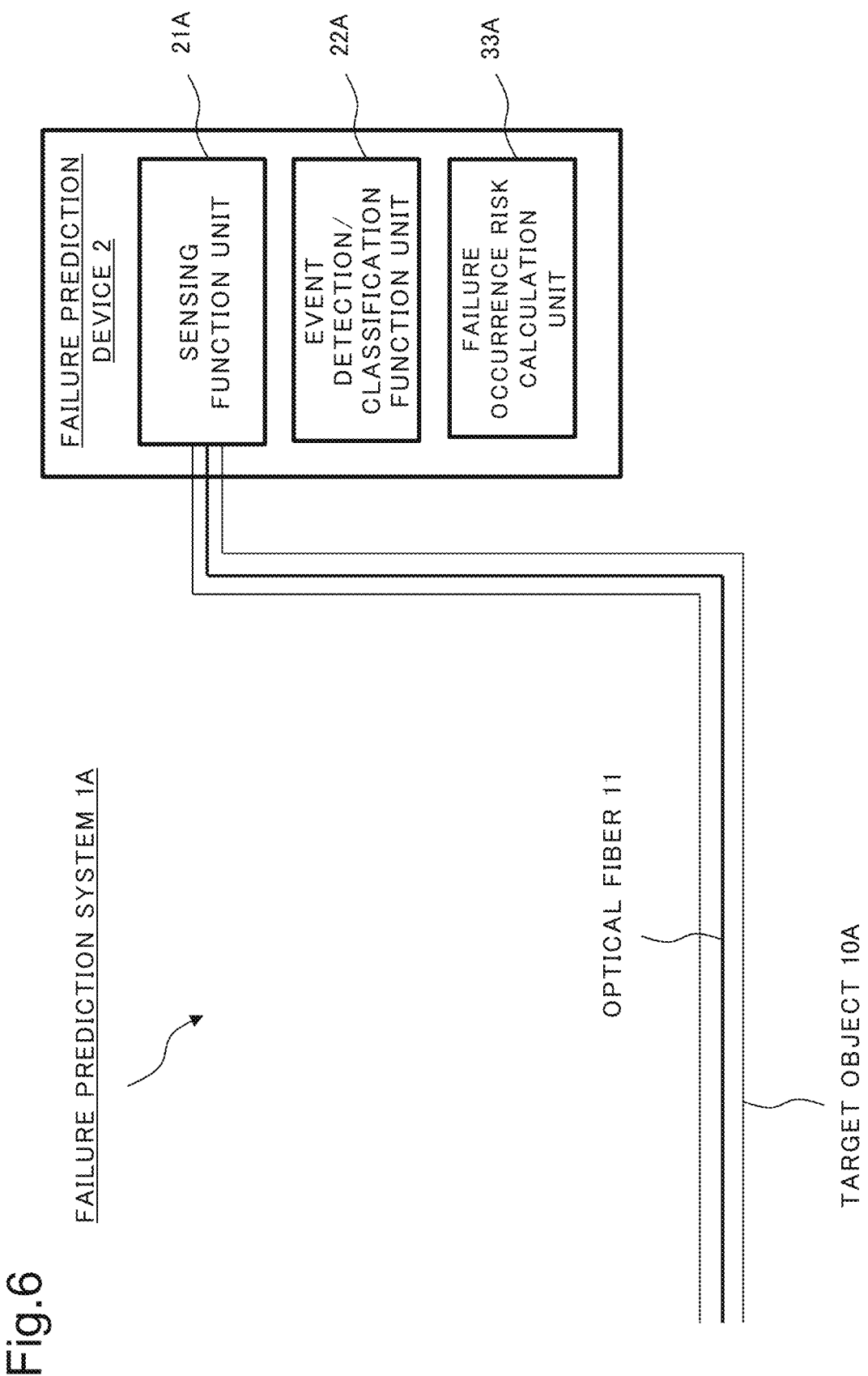
FIG. 6 is a block diagram illustrating a configuration example of a failure prediction device according to a third example embodiment of the present invention.

A failure prediction system 1A according to the third example embodiment is described with reference to FIGS. 6 and 7. FIG. 6 is a block diagram illustrating a configuration example of the failure prediction system 1A. As illustrated in FIG. 6, the failure prediction system 1A includes an optical fiber 11, a sensing function unit 21A, an event detection/classification function unit 22A, and a failure occurrence risk calculation unit 33A. In FIG. 6, the sensing function unit 21A is provided separately of the event detection/classification function unit 22A, but may be configured as a single unit.

Figure 1:
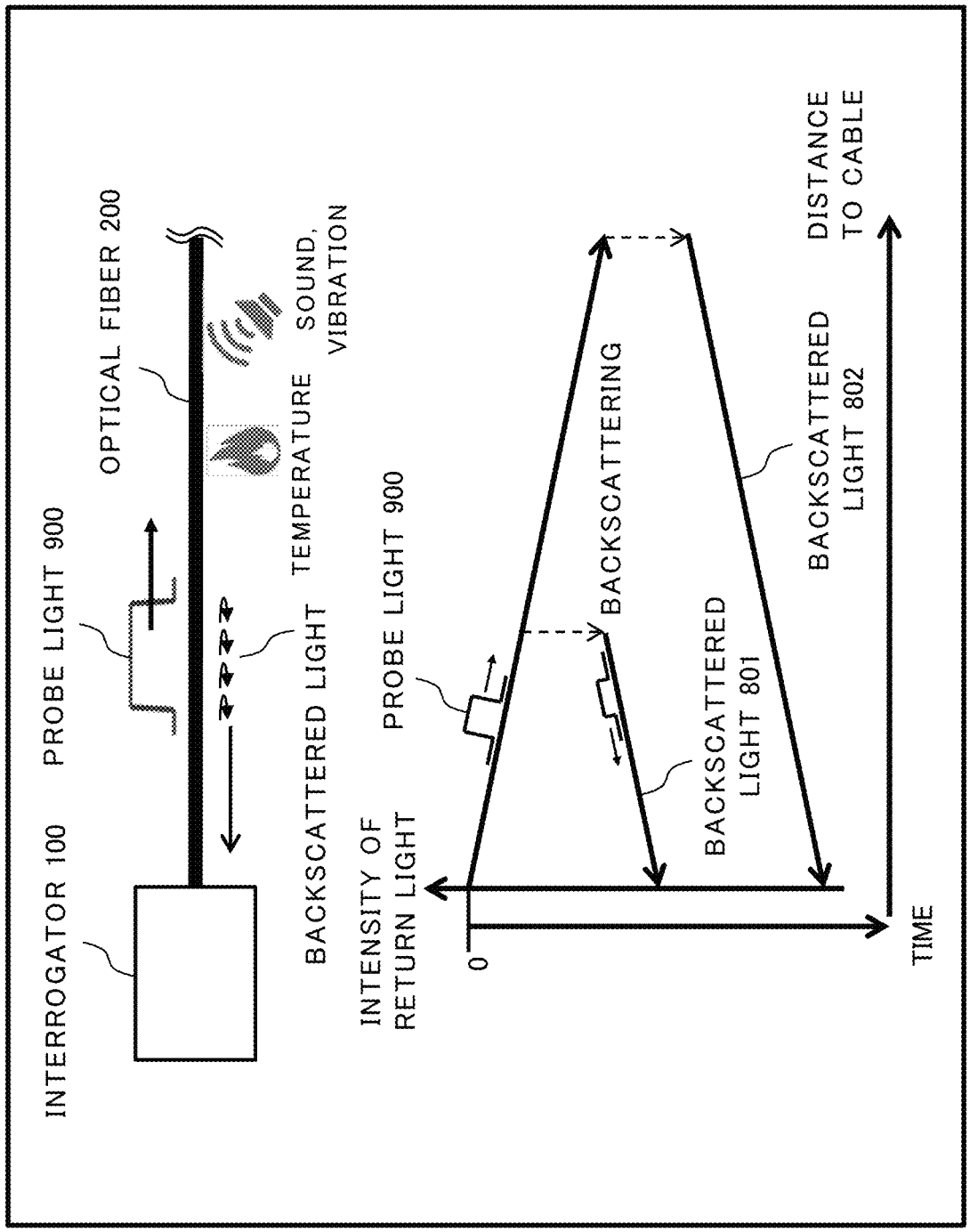
FIG. 1 is a diagram for describing an operation of an optical fiber sensing system according to a general OTDR method.

The optical fiber 11 is laid along a target object 10A. As illustrated in FIG. 1, the optical fiber 11 may be accommodated in the target object 10A. The target object 10A is, for example, a communication cable, a power transmission cable, or a pipeline.

The sensing function unit 21A acquires environmental information of the target object 10A from backscattered light of probe light output to the optical fiber 11. This environmental information is data in a form of an observation value at each place and each time. The event detection/classification function unit 22A classifies simultaneously when finding an event included in acquired environmental information. The event detection/classification function unit 22A may further output a degree of intensity of an event, and the like, in addition to a type of an event.

For example, the event detection/classification unit 22A includes in advance, as a classification condition, one or more features included in environmental information in a case in which a certain event has occurred in the target object 10A. The event detection/classification function unit 22A includes a classification condition for discriminating a feature appearing when an object such as a rock hits the target object 10A. In a case in which such a feature is included in environmental information, the event detection/classification function unit 22A classifies the event according to the classification condition. Meanwhile, an event that does not occur in an ordinary case, but the type of which is unknown is also detectable, and in this case, the event detection/classification function unit 22A classifies the event, as an unknown event. Note that, in the foregoing description, the sensing function unit 21A acquires environmental information from backscattered light, but environmental information may be acquired by another method. For example, as disclosed in PTL 6 or NPL 3, the sensing function unit 21A may acquire environmental information by using transmitted light. The event detection/classification function unit 22A is one example of an event classification function unit.

The failure occurrence risk calculation unit 33A includes in advance one or more failure models acquired by modeling a physical mechanism by which the target object 10A is led to a failure. By inputting, to a failure model, a history on event data of an associated type, a degree of damage by the mechanism is calculated. The degree of damage is, for example, a current degree of damage expressed based on a degree of damage led to a function failure.

The failure occurrence risk calculation unit 33A includes one or more failure models described above, and outputs a failure occurrence probability or availability in a designated section by summing an output value of each failure model.

Next, an operation example of the failure prediction system 1A is described with reference to FIG. 7. FIG. 7 is a flowchart illustrating an operation of the failure prediction system 1A.

The sensing function unit 21A acquires environmental information of the target object 10A from backscattered light of probe light output to the optical fiber 11 (S301).

The event detection/classification function unit 22A performs classification by finding an event from the environmental information (S302).

The failure occurrence risk calculation unit 33A inputs, to a failure model, a history on event data classified by the event detection/classification function unit 22A, and calculates a failure occurrence probability or availability of the target object 10A by summing an output value of these one or more failure models (S303).

As described above, in the failure prediction system 1A, event data extracted from environmental information acquired by using the optical fiber 11 laid along the target object 10A are accumulated, and a failure occurrence probability is calculated in light of an individual failure occurrence mechanism. This allows a failure prediction device 2 to predict a future failure occurrence risk. Thus, an advantageous effect similar to that of the failure prediction system 1 described in the first and second example embodiments 2 is provided.

In the foregoing, description has been made in which the failure prediction device 2 predicts failure occurrence in the target object 10A. Utilizing this information at a time of setting a price or a lease fee for a target object is beneficial. For example, a higher fee is set for a target object with high availability.

A part or all of the above-described example embodiments may also be described as the following supplementary notes, but is not limited to the following.

(Supplementary Note 1)

A failure prediction system including:
  an optical fiber that is installed along a target object, and detects environmental information of the target object;
  a sensing function unit that acquires the environmental information sensed by the optical fiber;
  an event classification function unit that classifies an event occurring at each position of the target object being indicated by the environmental information, based on an event classification condition for each type; and
  a failure occurrence risk calculation unit including in advance one or more failure models acquired by modeling a physical mechanism by which the target object is led to a function failure, wherein
  a failure occurrence risk calculation unit inputs a history on the classified event to the failure model associated with the type of the event, calculates each failure occurrence risk by the mechanism in the target object, accumulates a result of the calculation in a designated section, and outputs the accumulated result as a risk or availability.

(Supplementary Note 2)

The failure prediction system according to supplementary note 1, wherein
  the target object is a communication cable, a power transmission cable, or a pipeline.

(Supplementary Note 3)

The failure prediction system according to supplementary note 1 or 2, wherein
  the system accepts a result acquired by analyzing a cause of a failure and a degree of damage, and,
  in a case in which the cause is associated to an existing failure model, the system compares the degree of damage with an estimated degree of damage to be acquired by inputting the classified event data history to an associated failure model, and adjusts an internal parameter of the failure model in such a way that actuality and an estimation result match with each other.

(Supplementary Note 4)

The failure prediction system according to any one of supplementary notes 1 to 3, wherein
  the system accepts a result acquired by analyzing a cause of a failure and a degree of damage, and,
  in a case in which the cause is not associated to an existing failure model,
    the system generates a new failure model from a history on the classified event, and a time of occurrence of the failure by investigating a physical mechanism of the cause.

(Supplementary Note 5)

The failure prediction system according to any one of supplementary notes 1 to 4, wherein the event classification function unit classifies the event, based on the environmental information indicating at least one of a sound, a vibration, and a temperature.

(Supplementary Note 6)

The failure prediction system according to any one of supplementary notes 1 to 5, wherein the event classification function unit classifies the event, based on a change in the environmental information over time.

(Supplementary Note 7)

The failure prediction system according to any one of supplementary notes 1 to 6, wherein the availability is used for evaluation of value of the target object.

(Supplementary Note 8)

The failure prediction system according to any one of supplementary notes 1 to 6, wherein the accumulated risk information is used for implementation and planning of preventative maintenance of the target object.

(Supplementary Note 9)

The failure prediction system according to any one of supplementary notes 1 to 6, wherein the accumulated risk information is used for route designing of the target object.

(Supplementary Note 10)

The failure prediction system according to any one of supplementary notes 1 to 9, wherein the event classification function unit performs classification after eliminating, from the environmental information, a portion where the event is clearly not included.

(Supplementary Note 11)

The failure prediction system according to any one of supplementary notes 1 to 10, wherein the event classification function unit performs classification after dividing the environmental information into a plurality of frequency bands.

(Supplementary Note 12)

The failure prediction system according to any one of supplementary notes 1 to 11, wherein the event classification function unit performs classification after correcting the acquired environmental information, based on at least either of a type of the target object, and a laying state of the target object.

(Supplementary Note 13)

The failure prediction system according to any one of supplementary notes 2 to 12, wherein, in a case in which the environmental information according to a same sound or vibration is acquired from a plurality of positions of the optical fiber, the event classification function unit classifies the event occurring at the plurality of positions into the type, as one event.

(Supplementary Note 14)

The failure prediction system according to any one of supplementary notes 2 to 13, wherein the event classification function unit performs spatial separation of the vibration source by using the environmental information sensed by the optical fiber, as a sensor array output.

(Supplementary Note 15)

The failure prediction system according to any one of supplementary notes 2 to 14, wherein, in a case in which the event classification unit classifies the event into the type in which an occurrence position moves, the event classification unit derives a moving direction and a moving speed of an occurrence position of the event, based on position information on a plurality of positions of the target object at which the event has occurred.

(Supplementary Note 16)

A failure prediction method including:
acquiring environmental information sensed by an optical fiber that is installed along a target object, and detects the environmental information of the target object;
classifying an event occurring at each position of the target object being indicated by the environmental information, based on an event classification condition, for each type;
inputting a history on the classified event to a failure model acquired by modeling a physical mechanism by which the target object is led to a function failure, and associated with the type of the event; calculating each failure occurrence risk by the mechanism in the target object; and
accumulating a result of the calculation in a designated section, and outputting the accumulated result as a risk or availability.

(Supplementary Note 17)

A failure prediction device including:
a sensing function unit that acquires environmental information sensed by an optical fiber that is installed along a target object, and detects the environmental information of the target object;
an event classification function unit that classifies an event occurring at each position of the target object being indicated by the environmental information, based on an event classification condition for each type; and
a failure occurrence risk calculation unit including in advance one or more failure models acquired by modeling a physical mechanism by which the target object is led to a function failure, wherein
a failure occurrence risk calculation unit inputs a history on the classified event to the failure model associated with the type of the event, calculates each failure occurrence risk by the mechanism in the target object, accumulates a result of the calculation in a designated section, and outputs the accumulated result as a risk or availability.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

This application is based upon and claims the benefit of priority from Japanese patent application No. 2020-141353, filed on Aug. 25, 2020, the disclosure of which is incorporated herein in its entirety by reference.

REFERENCE SIGNS LIST 1, 1A Failure prediction system
2 Failure prediction device
10 Submarine cable
11 Optical fiber
20 DAS interrogator
21, 21A Sensing function unit
22 Event detection function unit
22A Event detection/classification function unit
30 Monitoring server
31 Event classification function unit
32 Database
33, 33A Failure occurrence risk calculation unit

What is claimed is:

1. A failure prediction system comprising:
an optical fiber configured to be installed along a target object, and detect environmental information of the target object;

a sensor configured to acquire the environmental information sensed by the optical fiber;

an event classifier configured to classify an event occurring at each position of the target object being indicated by the environmental information, based on an event classification condition, for each type; and a failure occurrence risk calculator including in advance one or more failure models acquired by modeling a physical mechanism by which the target object is led to a function failure, wherein the failure occurrence risk calculator inputs a history on the classified event to the failure model associated with the type of the event, calculates each failure occurrence risk by the mechanism in the target object, accumulates a result of the calculation in a designated section, and outputs the accumulated result as a risk or availability.

2. The failure prediction system according to claim 1, wherein
the target object is a communication cable, a power transmission cable, or a pipeline.

3. The failure prediction system according to claim 2, wherein, in a case in which the environmental information according to a same sound or vibration is acquired from a plurality of positions of the optical fiber, the event classifier classifies the event occurring at the plurality of positions into the type, as one event.

4. The failure prediction system according to claim 2, wherein the event classifier performs spatial separation of the vibration source by using the environmental information sensed by the optical fiber, as a sensor array output.

5. The failure prediction system according to claim 2, wherein, in a case in which the event classifier classifies the event into the type in which an occurrence position moves, the event classifier derives a moving direction and a moving speed of an occurrence position of the event, based on position information on a plurality of positions of the target object at which the event has occurred.

6. The failure prediction system according to claim 1, wherein
the system accepts a result acquired by analyzing a cause of a failure and a degree of damage, and,
in a case in which the cause is associated to an existing failure model, the system compares the degree of damage with an estimated degree of damage to be acquired by inputting the classified event data history to an associated failure model, and adjusts an internal parameter of the failure model in such a way that actuality and an estimation result match with each other.

7. The failure prediction system according to claim 1, wherein
the system accepts a result acquired by analyzing a cause of a failure and a degree of damage, and,
in a case in which the cause is not associated to an existing failure model,
the system generates a new failure model from a history on the classified event, and a time of occurrence of the failure by investigating a physical mechanism of the cause.

8. The failure prediction system according to claim 1, wherein the event classifier classifies the event, based on the environmental information indicating at least one of a sound, a vibration, and a temperature.

9. The failure prediction system according to claim 1, wherein the event classifier classifies the event, based on a change in the environmental information over time.

10. The failure prediction system according to claim 1, wherein
the availability is used for evaluation of value of the target object.

11. The failure prediction system according to claim 1, wherein
the accumulated risk information is used for implementation and planning of preventative maintenance of the target object.

12. The failure prediction system according to claim 1, wherein
the accumulated risk information is used for route designing of the target object.

13. The failure prediction system according to claim 1, wherein the event classifier performs classification after eliminating, from the environmental information, a portion where the event is clearly not included.

14. The failure prediction system according to claim 1, wherein the event classifier performs classification after dividing the environmental information into a plurality of frequency bands.

15. The failure prediction system according to claim 1, wherein the event classifier performs classification after correcting the acquired environmental information, based on at least either of a type of the target object, and a laying state of the target object.

16. A failure prediction method comprising:
acquiring environmental information sensed by an optical fiber that is installed along a target object, and detects the environmental information of the target object;
classifying an event occurring at each position of the target object being indicated by the environmental information, based on an event classification condition, for each type;
inputting a history on the classified event to a failure model acquired by modeling a physical mechanism by which the target object is led to a function failure, and associated with the type of the event;
calculating each failure occurrence risk by the mechanism in the target object; and
accumulating a result of the calculation in a designated section, and outputting the accumulated result as a risk or availability.

17. A failure prediction device comprising:
a sensing function unit that acquires environmental information sensed by an optical fiber that is installed along a target object, and detects the environmental information of the target object;
an event classification function unit that classifies an event occurring at each position of the target object being indicated by the environmental information, based on an event classification condition, for each type; and
a failure occurrence risk calculation unit including in advance one or more failure models acquired by modeling a physical mechanism by which the target object is led to a function failure, wherein
a failure occurrence risk calculation unit inputs a history on the classified event to the failure model associated with the type of the event, calculates each failure occurrence risk by the mechanism in the target object, accumulates a result of the calculation in a designated section, and outputs the accumulated result as a risk or availability.

* * * * *